Patented Aug. 28, 1951

2,565,471

UNITED STATES PATENT OFFICE 2,565,471

INSECTICIDAL COMPOSITIONS COMPRISING CHLORINATED CAMPHENE

George Allen Buntin, Wilmington, Del., assignor to Hercules Powder Company, Wilmington, Del., a corporation of Delaware No Drawing. Original application August 4, 1945, Serial No. 609,027. Divided and this application September 6, 1947, Serial No. 772,587

5 Claims. (Cl. 167—30)

This invention relates to an insecticidal composition and more particularly to an insecticidal composition containing a polychloro camphene as the toxic ingredient.

Among the more commonly used insecticidal toxicants are the naturally occurring products, pyrethrum, rotenone, and nicotine. These natural products have the very great disadvantage of not being uniform in their insecticidal activity. Many synthetic products have been suggested in the past as substitutes for these toxicants; however, they are usually lacking in one respect or another. They do not have a high enough killing power and must be used in concentrations which cause irritation to the user, or if they are sufficiently toxic, they are also toxic to forms of animal life other than insect pests.

Now in accordance with this invention it has been found that insecticidal compositions containing as a toxic ingredient a polychloro camphene, having a chlorine content of from about 40% to about 75%, possess an unusual degree of insecticidal activity. Because of the very high killing power of the polychloro camphenes, extremely dilute solutions of these toxicants are effective.

The following examples will illustrate the preparation of these polychloro camphenes and the insecticidal activity of compositions containing them.

EXAMPLE 1

One part of commercial camphene dissolved in 5 parts of carbon tetrachloride was placed in a chlorination vessel and exposed to ultraviolet illumination. Chlorine was passed into the agitated mixture at a rate that allowed for maximum absorption of the chlorine. The temperature rose immediately, due to the heat of the reaction, to 82° C. and gradually decreased as the chlorination proceeded until at the end of the chlorination (33 hours) the temperature had dropped to 50° C. After 15 hours of chlorination, samples were taken every 3 hours, a total of 7 samples being removed.

The carbon tetrachloride was removed from each of these samples by distillation under reduced pressure. An opaque, waxy solid remained in each case. This was dissolved in petroleum ether and the solution was washed with a sodium bicarbonate solution, then with water and finally was dried over sodium sulfate. The petroleum ether was distilled off under vacuum leaving an opaque, waxy solid which was analyzed for chlorine.

The 7 chlorinated camphene materials, of different chlorine content, were tested for their insecticidal activity against house flies. In this and the following examples, the test for insecticidal activity against house flies was made in the following manner and is referred to in this specification as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the official test insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analyses for chlorine content and of tests made on 1% solutions in Deo-Base of the above seven polychloro camphenes are given in the following table. The data are an average of a series of tests made on each solution.

*Bell jar tests on flies*

| Chlorination Time in Hrs. | Per Cent Chlorine | Per Cent Dead in 24 Hrs. | O. T. I. Difference |
|---|---|---|---|
| 15 | 51.7 | 87.6 | +48 |
| 18 | 55.55 | 99.6 | +60 |
| 21 | 58.45 | 100 | +60 |
| 24 | 61.9 | 100 | +60 |
| 27 | 64.05 | 100 | +60 |
| 30 | 65.7 | 100 | +60 |
| 33 | 66.65 | 100 | +60 |

EXAMPLE 2

One part of commercial camphene dissolved in 5 parts of carbon tetrachloride was chlorinated in the same manner as described in Example 1, external heating being applied after 30 hours of chlorination in order to maintain a reaction temperature of about 72° C. Samples were removed after chlorinating for 35 hours, 37 hours and 39 hours respectively. These samples were worked up and tested for their insecticidal activity as described in Example 1. In this case the insecticidal tests were made on 0.1% solutions of the polychloro camphenes in Deo-Base.

*Bell jar tests on flies*

| Chlorination Time in Hrs. | Per Cent Chlorine | Per Cent Dead in 24 Hrs. | O. T. I. Difference |
|---|---|---|---|
| 35 | 67.9 | 93 | +46 |
| 37 | 69.0 | 93 | +46 |
| 39 | 71.3 | 89 | +42 |

EXAMPLE 3

Commercial camphene was chlorinated as described in Example 1 for 30 hours. Chlorination was continued for an additional 40 hours, the reaction mixture being heated during this time by a finger of wet steam. Carbon tetrachloride was removed by distilling under vacuum and the oily material remaining was dissolved in petroleum ether. The petroleum ether solution was washed with a sodium bicarbonate solution, water, dried and the petroleum ether was distilled off under vacuum. The product had a chlorine content of 75.0%. A 5% solution of this polychloro camphene when tested against house flies by the bell jar method gave a 24-hour kill of 100% corresponding to an O. T. I. difference of +50.

EXAMPLE 4

Commercial camphene was chlorinated as described in Example 1 for a period of 9 hours. On working up the product as described in that example, an opaque, waxy solid was obtained which had a chlorine content of 40.4%. A 5% solution of this product in Deo-Base gave a 24-hour kill of 98% when tested against house flies by the Bell Jar Method which corresponds to an O. T. I. difference of +48.

EXAMPLE 5

A polychloro camphene containing 67.15% chlorine, prepared by chlorinating camphene, was tested for its insecticidal activity against adult male German roaches. In carrying out this test ten to fifteen roaches were placed in cages and sprayed with Deo-Base solutions of the toxicant. The results of these tests are given in the following table.

| Conc. of Solution | Average Per Cent Kill 24 Hrs. | O. T. I. Difference |
|---|---|---|
| Per cent | | |
| 1 | 72.5 | +21.5 |
| 2 | 98.0 | +47.0 |
| 2.5 | 100.0 | +49.0 |

EXAMPLE 6

Samples of upholstery cloth were treated with a solution of a polychloro camphene containing 67.3% chlorine in the amount of 0.8% of the polychloro camphene by weight of the cloth. Samples of the treated fabric and untreated fabric were then exposed to the three common fabric pests; black carpet beetle, webbing clothes moth and furniture carpet beetle. The results of these tests are:

| Sample | Injury | Per Cent Survivors | Siftings or frass, mg. |
|---|---|---|---|
| Black Carpet Beetle: | | | |
| treated cloth | 0 | 25 | 1 |
| untreated cloth | severe | 100 | 37 |
| Webbing Clothes Moth: | | | |
| treated cloth | 0 | 5 | 0 |
| untreated cloth | severe | 60 | 15 |
| Furniture Carpet Beetle: | | | |
| treated cloth | 0 | 5 | 1 |
| untreated cloth | severe | 80 | 18 |

EXAMPLE 7

A Deo-Base solution containing 90% of isobornyl thiocyanoacetate and 10% of a polychloro camphene containing 70.45% chlorine was tested for its insecticidal activity against flies by the official Peet-Grady method. The results of these tests are as follows:

| Conc. of Deo-Base Solution | Knockdown, 10 Min. | Per Cent Dead, 24 Hr. | O. T. I. Difference |
|---|---|---|---|
| Per cent | | | |
| 1.0 | 99 | 77.1 | +29.3 |
| 1.5 | 100 | 93.5 | +45.7 |
| 2.0 | 100 | 94.1 | +46.3 |
| 2.5 | 100 | 95.6 | +47.8 |

EXAMPLE 8

A polychloro camphene containing 67.3% chlorine was tested for its insecticidal activity against bedbugs. In these tests 0.25 ml. of a solution of the toxicant in Deo-Base was sprayed on about 60 bedbugs and the number dead at the end of 24 hours and 48 hours were counted. Results of these tests are:

| Conc. of Solution | 24 Hours | | 48 Hours | |
|---|---|---|---|---|
| | Per Cent Dead | O. T. I. Difference | Per Cent Dead | O. T. I. Difference |
| Per cent | | | | |
| 3 | 36 | −8 | 85 | +16 |
| 5 | 52 | +8 | 94 | +25 |

EXAMPLE 9

A wettable powder containing 25% of a polychloro camphene (66.0% chlorine) was tested for its insecticidal activity against agricultural pests. This powder contained 74.5% inert clay, 0.5% sodium dioctyl sulfo-succinate, and 25% of the polychloro camphene. The powder was prepared by adding an acetone solution of the polychloro camphene and the wetting agent to a slurry of the inert clay in acetone, allowing the mixture to dry and pulverizing the powder. This wettable powder was applied as a spray containing 0.125% of polychloro camphene to adult squash bugs, striped cucumber beetles, and 12-spotted cucumber beetles in the laboratory. At the end of 24 hours, 75% of the squash bugs and 100% of both species of the cucumber beetles were dead.

In a field experiment this wettable powder was applied as a spray containing 0.75% of polychloro camphene to potato plants at the rate of 200 gallons per acre. Following treatment, the potato leaf-hopper population on the treated plots was less than one-fifth that of the untreated controls.

Any polychloro camphene containing from about 40 to about 75% of chlorine may be used as the toxic ingredient of the insecticide compositions of this invention. The polychloro camphenes may be prepared by chlorinating camphene, camphene hydrochloride and isocamphane. The chlorination may be carried out in the presence or absence of a solvent. Lower temperatures are maintained during the chlorination, if a solvent is used; however, in some instances its is preferable to use high temperatures in order to obtain the desired degree of chlorination. Suitable solvents for the chlorination are chloroform, carbon tetrachloride, pentachloroethane, etc. A chlorination catalyst may be used if desired. Ultraviolet light is particularly efficient.

The chlorinated camphenes in accordance with this invention should contain an amount of chlorine of about 40% to about 75%, preferably from about 60% to about 72%. As may be seen from the foregoing examples, polychloro camphenes having a chlorine content within the preferable range have a very high insecticidal activity even in solutions as dilute as 0.1%. Chlorinated camphenes having a chlorine content of less than 40% are so inactive as to be worthless as insecticides. The same thing is true for polychloro camphenes having a chlorine content above 75%, as the insecticidal activity decreases greatly as the chlorine content is raised above this point.

The insecticidal compositions of this invention may be made up of the polychloro camphene admixed with any suitable type of diluent. If a liquid spray is desired the polychloro camphene may be dissolved in any convenient solvent, such as kerosene or Deo-Base, or it may be dispersed in water to form aqueous sprays. Insecticidal dusts may be prepared by placing the polychloro camphene on a diluent or carrier such as powdered carbon, kieselguhr, bentonite, pyrophyllite, etc.

For many purposes, it may be desirable to use the polychloro camphenes in combination with other insecticidal toxicants. Many toxicants have a very high knockdown in relatively dilute solutions, but higher concentrations must be used in order to obtain the desired degree of kill. Due to the very high degree of killing power which the polychloro camphenes possess, these compounds may be added to such toxicants, thereby enabling the use of much more dilute solutions than would otherwise be possible. Toxicants with which these polychloro camphenes may be combined include such compounds as rotenone, pyrethrum, and organic thiocyanates such as alkyl thiocyanates, thiocyano ethers such as $\beta$-butoxy-$\beta'$-thiocyanoethyl ether, and terpene thiocyanoacylates such as isobornyl thiocyanoacetate, fenchyl thiocyanoacetate and isobornyl $\alpha$-thiocyanopropionate.

As may be seen from the foregoing examples, the polychloro camphenes have an extremely high insecticidal activity, even 0.1% solution giving a kill of 100% when used on house flies. Thus the insecticidal compositions of this invention may contain any amount of the polychloro camphene that is effective against the pest being killed. For use as a household fly spray, these compounds are effective in as dilute a solution as 0.1% in Deo-Base, although for a general household insecticide 1 to 2% solutions might be desired. However, for killing many types of pests it will be desirable to use much higher concentrations of these toxicants.

The insecticidal compositions of this invention are useful in combatting flies, mosquitoes, roaches, moths, carpet beetles, bedbugs, and many other pests.

This application is a division of my application for United States Letters Patent Serial No. 609,027, filed August 4, 1945, now abandoned.

What I claim and desire to protect by Letters Patent is:

1. An insecticidal composition comprising the product obtained by the chlorination with chlorine gas of at least one material of the group consisting of camphene, camphene hydrochloride, and isocamphane at an elevated temperate to a chlorine content of from about 60% to about 72%, said temperature being below that at which the product decomposes.

2. An insecticidal composition comprising the product obtained by the chlorination with chlorine gas of at least one material of the group consisting of camphene, camphene hydrochloride, and isocamphane at an elevated temperature to a chlorine content of from about 60% to about 72%, said temperature being below that at which the product decomposes, and a solid carrier.

3. An insecticidal composition comprising an aqueous dispersion of the product obtained by the chlorination with chlorine gas of at least one material of the group consisting of camphene, camphene hydrochloride, and isocamphane at an elevated temperature to a chlorine content of from about 60% to about 72%, said temperature being below that at which the product decomposes.

4. An insecticidal composition comprising the product obtained by the chlorination with chlorine gas of at least one material of the group consisting of camphene, camphene hydrochloride, and isocamphane at an elevated temperature to a chlorine content of from about 60% to about 72%, said temperature being below that at which the product decomposes, and a hydrocarbon solvent therefor.

5. An insecticidal composition comprising the product obtained by the chlorination of camphene with chlorine gas at an elevated temperature to a chlorine content of about 67%, said temperature being below that at which the product decomposes.

GEORGE ALLEN BUNTIN.

REFERENCES CITED

The following references are of record in the file of this patent:

UNITED STATES PATENTS

| Number | Name | Date |
|---|---|---|
| 1,366,106 | Weeks | Jan. 18, 1921 |
| 2,010,841 | Bender | Aug. 13, 1935 |
| 2,209,184 | Borglin | July 23, 1940 |
| 2,337,043 | Hasselstrom et al. | Dec. 21, 1943 |

FOREIGN PATENTS

| Number | Country | Date |
|---|---|---|
| 392,182 | France | Nov. 19, 1908 |
| 348,484 | Germany | Feb. 10, 1922 |

OTHER REFERENCES

Simonsen, "The Terpenes," vol. II, pages 285–7.

Aschan, "Ber. der. deut. chem. Gesell." vol. 61B, pages 38–45 (1928).

Frankforter, "Jour. Am. Chem. Soc.," vol. 28, pages 1461–5 (1906).

Simonsen, "The Terpenes," vol. II, pages 266–7, 281 (1932).

Certificate of Correction

Patent No. 2,565,471                                  August 28, 1951

GEORGE ALLEN BUNTIN

It is hereby certified that error appears in the printed specification of the above numbered patent requiring correction as follows:

Column 4, line 66, for "its is" read *it is*; column 6, line 4, for "temperate" read *temperature*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*